Patented Mar. 26, 1929.

1,706,878

UNITED STATES PATENT OFFICE.

LEON W. GELLER, OF HAMBURG, NEW YORK, ASSIGNOR TO NATIONAL ANILINE & CHEMICAL CO., INC., OF NEW YORK, N. Y., A CORPORATION OF NEW YORK.

DISAZO PYRAZOLONE COLORING MATTERS WHICH CONTAIN A 1.5-DIHYDROXYNAPHTHALENE NUCLEUS.

No Drawing.　　Application filed December 23, 1925.　Serial No. 77,376.

This invention relates to the manufacture and production of disazo coloring matters of the pyrazolone series which are capable of being chromed and are of value in dyeing wool and other material, and for the production of useful lakes and pigments. The product obtained by treating material, as by dyeing, printing or painting, with one or more of the compounds, or with a lake or pigment thereof, also constitutes a part of the present invention.

The new disazo coloring matters can be obtained by coupling a diazotized aminobenzene-azo-arylpyrazolone body into 1.5-dihydroxynaphthalene or by coupling a diazotized aminobenzene-azo-1.5-dihydroxynaphthalene body into an arylpyrazolone body. The benzene nucleus in the aminobenzene radical or the aryl nucleus in the pyrazolone radical, or in both, may contain substituents, e. g., Cl, $CH_3$, COOH, OH, $SO_3H$, $SO_2NH_2$, etc.; and particularly valuable are the disazo coloring matters which carry an acid-group, e. g., a carboxyl or a sulfonic group, more especially the latter, as a substituent in one or both of said nuclei.

The new disazo compounds correspond with the formula

wherein R signifies a 1-aryl-5-pyrazolone residue, more particularly of the benzene series, and which may contain substituents in the aryl nucleus, R′ a benzene nucleus which may contain substituents, and R″ a 1.5-dihydroxy-naphthalene residue which is free from other substituents.

It is preferable that the two azo bridges be in para-position to one another in their attachment to the center component, R′. The new components in the dry and pulverized state constitute yellow to red to brownish-black powders soluble in concentrated sulfuric acid with intense colorations. Upon reduction, for example with stannous chloride and hydrochloric acid, they yield an aminopyrazolone body, a diamino body of the benzene series, and amino-1.5-dihydroxynaphthalene. Those containing an acid radical, i. e., COOH, $SO_3H$, etc., in the form of their sodium salts are soluble in water with an intense coloration, and dye wool in an acid bath yellow to red shades which by after-chroming change to orange to red to brown tints.

The following specific example will further illustrate the invention, but it will be understood that the invention is not limited thereto. The parts are by weight.

Example: 13.8 parts of para-nitraniline are diazotized in the usual manner by means of 7 parts of sodium nitrite, 40 parts of 20° Bé. hydrochloric acid, 100 parts water and sufficient ice to keep the temperature at about 0°–10° C. The diazo solution thus obtained is introduced into a well stirred solution of 27.6 parts of the sodium salt of 1-(4′-sulfophenyl)-3-methyl-5-pyrazolone dissolved in 100 parts of water containing sufficient sodium carbonate to maintain an alkaline reaction throughout the combination, the temperature being kept at about 0°–10° C. When the combination is complete, the solution is acidified by means of hydrochloric acid and the precipitated monazo dyestuff filtered off and washed. It is then suspended in about 500 parts water, neutralized by the addition of sodium carbonate, heated to 50°–60° C., and a ten per cent solution of sodium disulfide is slowly added, with stirring, until an excess of the sulfide is present. The nitro group is thus reduced to an amino group. The solution is cooled, acidified with hydrochloric acid, filtered, the precipitate re-dissolved in 250 parts water containing about 15–30 parts of sodium carbonate, and the solution filtered from any precipitated sulfur which may be present. The filtrate, after acidification with hydrochloric acid, is then diazotized in the usual manner at a temperature of about 0°–5° C. by means of the necessary amount of sodium nitrite solution, and the diazo solution thus obtained introduced into a solution containing 15 parts of 1.5-dihydroxynaphthalene and 12 parts of caustic soda dissolved in about 100 parts water. When the coupling is complete, the disazo dyestuff is precipitated by the addition of common salt, filtered off and dried.

The dyestuff thus obtained is the sodium salt of an acid having the probable formula:

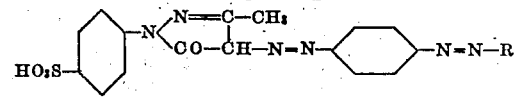

wherein R signifies a 1.5-dihydroxynaphthalene nucleus free from other substituents; and more particularly, the probable formula:

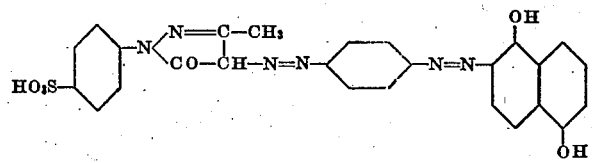

It is a brownish-black to black powder, soluble in concentrated sulfuric acid, soluble in water giving a reddish-black solution, and dyes wool in an acid bath maroon shades which on after-chroming change to brown tints fast to light, fulling and washing.

In the above example, an equivalent amount of para-aminoacetanilide may be used in place of the para-nitraniline, the acetyl group in the monazo dyestuff thus obtained being subsequently replaced by hydrogen by saponification before diazotization, and the diazotized amino-monazo body combined with 1.5-dihydroxynaphthalene. The same dyestuff may be obtained by coupling diazotized para-nitraniline or para-aminoacetanilide under suitable conditions into 1.5-dihydroxynaphthalene, and, after reducing the nitro group to an amino group or replacing the acetyl group by hydrogen, as the case may be, diazotizing the amino-monazo dyestuff thus obtained and combining it with the pyrazolone.

In a similar manner, other analogous disazo compounds may be obtained by employing other pyrazolones and other nitranilines or other monoacetyl-diamines of the benzene series, their isomers, homologues, or substitution products.

In the specification and claims, it will be under stood that the pyrazolones contemplated in the present invention carry a methyl or a carboxyl group in the 3-position in the pyrazolone nucleus unless otherwise specified, and are capable of combining in the 4-position with diazo compounds.

I claim:

1. As new products, the disazo coloring matters which correspond with the probable formula

wherein R signifies a nucleus of a 1-aryl-5-pyrazolone body, R' a nucleus of an aryl body of the benzene series, and R" a 1.5-dihydroxynaphthalene residue.

2. As new products, the disazo coloring matters which correspond with the probable formula

where in R signifies a 1-aryl-5-pyrazolone nucleus of the benzene series in which the benzene nucleus may contain substituents, R' represents a benzene nucleus which may carry substituents, and R" a 1.5-dihydroxynaphthalene residue.

3. As new products, the disazo coloring matters which correspond with the probable formula

wherein R signifies a 1-aryl-5-pyrazolone nucleus of the benzene series which may contain substituents in the benzene nucleus, R' a benzene nucleus which may carry substituents, R" a 1.5-dihydroxynaphthalene residue; and wherein the azo groups occupy a para-position with reference to one another.

4. As new products, the disazo coloring matters which correspond with the probable formula

wherein R signifies a 1-aryl-5-pyrazolone nucleus of the benzene series, R' a benzene nucleus, R" a 1.5-dihydroxynaphthalene residue; and wherein at least one of said benzene nuclei carries an acid-group as a substituent.

5. As new products, the disazo coloring matters which correspond with the probable formula

wherein R signifies a nucleus of a 1-aryl-5-pyrazolone body of the benzene series which carries an acid-group as a substituent in the benzene nucleus, R' a nucleus of an aryl body of the benzene series, and R" a 1.5-dihydroxynaphthalene residue.

6. As new products, the disazo coloring matters which correspond with the probable formula $$R-N=N-R'-N=N-R''$$

wherein R signifies a 1-aryl-5-pyrazolone nucleus of the benzene series, R' a benzene nucleus, R" a 1.5-dihydroxynaphthalene nucleus; and wherein at least one of said benzene nuclei carries a sulfonic group as a substituent.

7. As a new product, the disazo coloring matter which in the free state corresponds with the probable formula

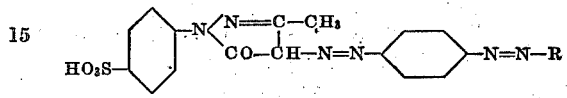

wherein R signifies a 1.5-dihydroxynaphthalene nucleus free from other substituents.

8. Material dyed with a coloring matter of claim 1.

9. Material dyed with a coloring matter of claim 2.

10. Material dyed with a coloring matter of claim 3.

11. Material dyed with a coloring matter of claim 4.

12. Material dyed with a coloring matter of claim 5.

13. Material dyed with a coloring matter of claim 6.

14. Material dyed with the coloring matter of claim 7.

15. As new products, the disazo coloring matters which correspond with the probable formula

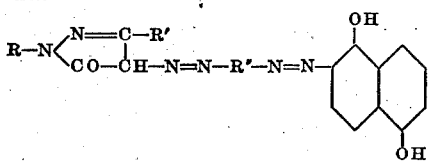

wherein R denotes an aryl group which may carry substituents, R' a methyl or a carboxyl group, and R" an aryl group of the benzene series which may carry substituents.

16. Material dyed with a coloring matter of claim 15.

In testimony whereof I affix my signature.

LEON W. GELLER.